Figure 1:
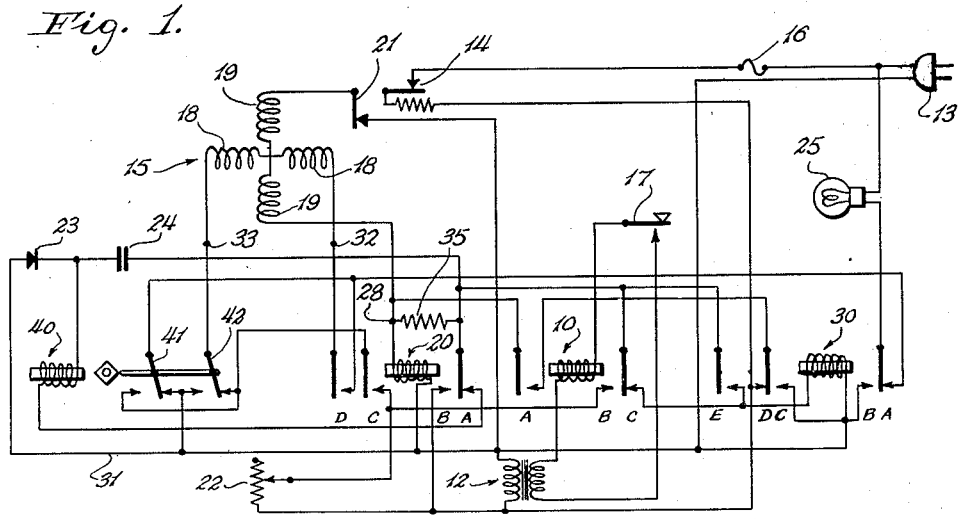

Sept. 23, 1952 G. F. RICHARDS 2,611,888
REVERSIBLE ELECTRIC CONTROL SYSTEM
Filed Jan. 7, 1950 2 SHEETS—SHEET 1

INVENTOR.
GEORGE F. RICHARDS
BY
Thomas M. Ferrill Jr.
ATTORNEY.

Sept. 23, 1952        G. F. RICHARDS        2,611,888

REVERSIBLE ELECTRIC CONTROL SYSTEM

Filed Jan. 7, 1950        2 SHEETS—SHEET 2

INVENTOR.

GEORGE F. RICHARDS

BY Thomas M. Ferrill, Jr.

ATTORNEY.

Patented Sept. 23, 1952

2,611,888

UNITED STATES PATENT OFFICE 2,611,888

REVERSIBLE ELECTRIC CONTROL SYSTEM

George F. Richards, Garden City, N. Y., assignor to Teletronics Laboratory, Inc., Westbury, N. Y., a corporation of New York Application January 7, 1950, Serial No. 137,410

9 Claims. (Cl. 318—202)

1

The present invention relates to automatic control systems, and particularly to systems for propulsion of a movable object between a plurality of predetermined positions.

In particular, an object of the present invention is the provision of a control system suitable for controlling the propulsion of an object such as a garage door between two limiting positions—the fully closed door position and the fully opened position.

A special feature of this invention is the elimination of extensive reliance upon limit switches, the apparatus being arranged to be turned off and reset for a further operation by deceleration of the motor due to the physical resistance met as the garage door or other movable object arrives at the limit of its travel.

A further feature is the organization of the control circuits so that the movable object may be started from any position by a momentary actuation of a single input circuit, as by depression of a local manual push-button switch or a closing of a relay in the output of a radio receiver located adjacent the movable object by a remote control vehicle transmitter which is manually switched on momentarily at the remote position for an impulse transmission. An accompanying feature is the arrangement of the circuit to stop the movable object in response to a momentary local or remote control circuit actuation signalled while the object is being propelled, and to reset the circuits to cause its propulsion in response to the next signal. When the object is slowed down by its encounter with increased resistance, the propulsion circuit not only is stopped in response to decelerated motor operation but also the control circuits are reset to provide for institution of propulsion in the opposite direction upon the receipt of a further control impulse.

In my copending patent application Serial No. 45,759 filed August 23, 1948, of which the present application is a continuation-in-part, there is described a door control system including a reversible electric motor belt-coupled to the counterspring shaft of a sectional garage door of the type which is raised upward and inward of the garage, the door being guided by rollers operating in a pair of tracks having vertical sections at the sides of the door opening and slightly inclined sections within the garage.

In the aforementioned application, circuits were provided for having the motor normally start in the direction for raising the door, from any position other than its fully raised position. The propulsion system was arranged to be stopped by a set of cam switches operated as the

2 door arrived at the top of its travel, these switches being arranged to be held in a reversed-starting condition in such a way as to provide downward door propulsion upon a following operation of the system. It depended upon the cam being so situated as to hold the switches in the reverse-starting throw position until after the motor had accelerated beyond the speed at which it had opened the circuit to its direction-controlling starting winding through the operation of its centrifugal switch. To this extent, the system of said prior application was dependent upon accurate placement of one cam and upon speed and load characteristics of the motor and its load.

In its downward drive, on the other hand, it was load-responsive, to be stopped by excessive resistance, and was arranged for upward travel upon the next operation by virtue of its normal (upward propulsion) directional circuit being undisturbed with the door cam remote from the cam switches.

In this application are shown three control system embodiments which are entirely stepcyclic in their operation, and are free from reliance upon any cam switches or travel limit switches.

One momentary circuit actuation when the door is at rest sets up circuits driving it until it reaches its normal travel limit or is otherwise obstructed. Another momentary circuit actuation sets up circuits driving the door in the opposite direction until it reaches its normal travel limit or is sooner obstructed. A control circuit actuation during propulsion has the effect of stopping the propulsion system and resetting it for the opposite direction whichever was the direction of travel at the time of interruption. Maximum safety of operation is achieved in this way, and great installation simplicity also results from this arrangement. Moreover, it enjoys a great advantage of adaptability to varying conditions, e. g. to an ice layer formed on the apron and raising the lower contact point of the descending door, or even a shift in position of the upper travel stop of the door.

Figure 2:
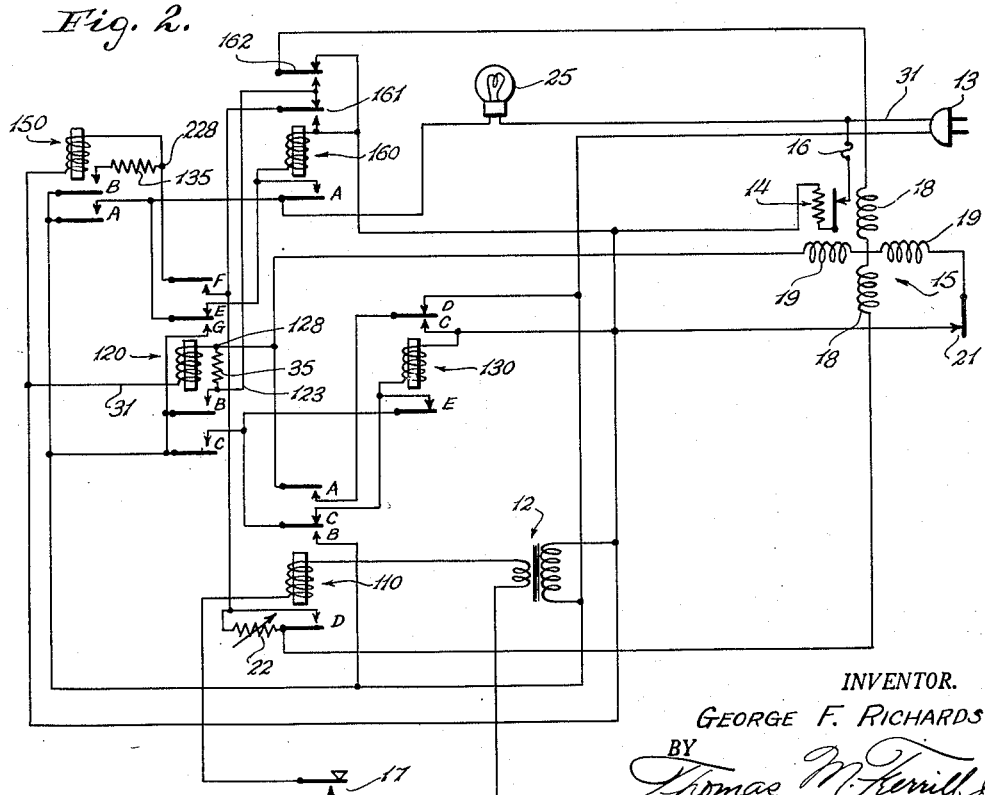
Figure 3:
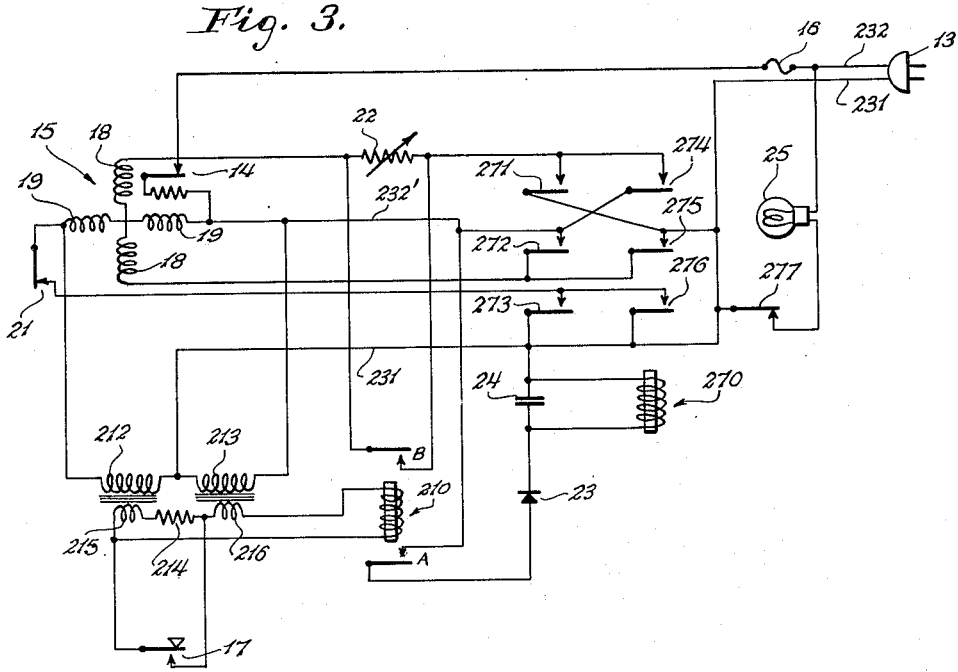

Three embodiments of the invention are shown in Figs. 1, 2 and 3, and Fig. 4 shows details of a sequence stepping relay usable in the embodiment of Fig. 3.

In each of these embodiments, the motor will be described as coupled to a sectional garage door by a belt from speed reduction gears of the motor to the counterspring shaft of the door, as illustrated in the aforementioned parent application Serial No. 45,759, the door being limited in its upward travel by track stops and in its descent by the garage floor. It will be appreciated that the control system is applicable also to other objects movable between opposite limits of travel.

The control circuit arrangement of Fig. 1 comprises a low voltage A. C. relay 10, a first line voltage A. C. relay 20 and a second line voltage A. C. relay 30, and a D. C. operated sequence stepping relay 40. Relay 10 includes a normally open contactor 10A, and a double throw contact arrangement including a normally open contactor 10B and a normally closed contactor 10C. Relay 20 includes a double throw contactor including a normally closed contactor arrangement 20A, a normally open contactor arrangement 20B and a pair of additional normally open contactors 20C and 20D. Relay 30 includes a first double throw contact arrangement having a normally closed contactor 30A and a normally open contactor 30B, a second double throw contactor including a normally closed contactor 30D and normally open contactor 30C and an additional normally open contactor 30E. Relay 40 is provided with double-pole double-throw switching arrangements, for reversibly connecting the A. C. supply mains to the running winding of the motor, as will presently be described.

A voltage step-down transformer 12 is arranged with its primary winding connected to the power supply plug 13 through a thermal cutout 14 on motor 15, and a fuse 16 included as an added protective device in the line circuit.

The low voltage secondary winding of transformer 12 is connected to the coil of relay 10 through push button switch 17, which is normally open, and is arranged to be depressed momentarily.

The motor 15 is illustrated as a single phase induction motor of the type having a running winding 18 and a starting winding 19, the motor being provided also with a centrifugal starting switch 21 arranged to open the starting winding circuit as the rotor is accelerated beyond a predetermined speed. The direction of operation of the motor is dependent upon whether the windings 18 and 19 are supplied cophasally during starting, or in opposite phase. The illustrated control circuit, as will presently be described, is arranged for starting of the motor first in one direction, and for subsequent starting thereof in the opposite direction, within one complete operating cycle of the system.

A variable resistor 22 is included in the circuit through which the running winding of the motor receives its current supply, this resistor being provided to enable the user to preset the motor operating conditions for desired torque-speed characteristics, sufficient resistance being introduced by the adjustment of rheostat 22 to insure that the motor speed will be reduced sufficiently to bring about the reclosure of switch 21 with a torque load exceeding by a reasonably small margin the normal running torque of the system. Such a speed reduction of the motor will hereafter be referred to as a stalling thereof.

The rotor of motor 15 is coupled through speed-reduction system preferably including a gear train and a V-belt drive, to a pulley attached to the counterspring shaft of a sectional overhead door of a garage in the manner described in my copending patent applications Serial No. 45,759 filed August 23, 1948, and Serial No. 79,215 filed March 2, 1949, the present application being a continuation-in-part of the former, as heretofore pointed out.

A dry disc rectifier 23 and a capacitor 24 are provided in the circuit for the operation of the coil of relay 40, and a lamp 25 is provided in connection with relay 30 and arranged to be illuminated when the garage door is in upward and downward transit and when the garage door is open, this lamp being extinguished when the garage door is closed.

The interconnections of relays 10, 20, 30 and 40 and the special cyclical operation in response to successive momentary depressions of switch 17 will now be brought out more fully in the description of the operation of the system.

The conditions of the circuit elements as illustrated, with all relays in their relaxed or non-energized conditions and with lamp 25 illuminated, correspond to the conditions with the garage door open, and at rest at the top of its travel. Now, switch 17 (or a normally open contactor of a remote control radio receiver output relay in parallel therewith) is momentarily closed to start the downward drive of the garage door. The closure of this switch operates relay 10, and through contactor 30D and contactor 10A, relay 20 is energized. Now, alternating voltage is supplied from alternating current conductor 31, through arm 41 of relay 40, through contactor 20D, to the motor running winding terminal 32, and the other motor running winding terminal 33 is supplied through arm 42 of relay 40, through contactor 20C. As the motor starting winding 19 is supplied through a connection in parallel with the coil of relay 20, the motor commences to drive the garage door downward. It quickly accelerates beyond the predetermined speed at which switch 21 is automatically opened, and thereafter switch 17 is released, opening the circuit of relay 10. Relay 20 is not deenergized at this point, however, because a holding circuit therefor was provided upon its momentary closure through contactor 20B and resistor 35.

At the opening of switch 17 and the immediate deenergization of relay 10, the alternating current supply circuit through contactor 20B is extended through reclosed contactor 10C to the coil of relay 30, the opposite end of which is connected to supply main 31. Accordingly, this relay is now energized, and the double throw contact arm connected to lamp 25 is transferred to the position closing contactor 30B, causing the lamp 25 to wink off and immediately on again, with its supply brought through this circuit instead of the previous circuit through contactor 30A, as before. Also contactor 30D is opened and contactors 30E and 30C are closed.

Now the motor 15 continues to drive the garage door downward until the door encounters appreciable increased resistance to its descent, the condition which normally occurs at complete closure of the door. At that point, centrifugal speed-responsive switch 21 recloses because of the stalling of motor 15, and, through the very low resistance of starting winding 19, a substantially short-circuiting shunt path is provided between supply main 31 and the terminal 28 of relay 20. As the opposite coil terminal is permanently connected to supply main 31, this effectively shorts out the supply to this relay winding, incidentally momentarily placing the full line voltage across resistor 35, and accomplishing the desired effect of causing prompt release of the contact arms of relay 20, so that contactor 20A recloses and the remaining contactors are reopened, the holding circuit condition for this relay being ended.

During the period of energization of relay 20, with contactor 20B closed and contactor 20A open, series-connected rectifier 23 and capacitor 24 were in circuit with the alternating voltage supply mains, and capacitor 24 was charged to a direct voltage of approximately 150 volts. With the reclosure of contactor 20A, capacitor 24 is connected in direct circuit with the winding of relay 40, actuating this relay and causing it to shift its contact arms 41 and 42 to the opposite connections, i. e., to the left as seen in Fig. 1.

With the opening of contactor 20B, furthermore, the alternating current supply circuit for the coil of relay 30, which proceeded thence through contactor 10C and contactor 30E, in parallel, was opened, leaving relay 30 deenergized. With arms 41 and 42 of relay 40 transferred to their left-hand throw, the alternating current circuit connections for motor running coil supply terminals 32 and 33 are reversed, terminal 33 being connected to supply main 31. Accordingly, the next starting operation to be instituted must cause motor 15 to commence operation in the opposite direction, i. e. to raise the garage door.

The lamp 25 is deenergized, as aforementioned, since its circuit through reclosed contactor 30A proceeds now through contact arm 41 transferred to the left, and encounters an open circuit condition at contactor 20C.

From the foregoing description, it is seen that the reclosing of switch 21 as motor 15 stalled in driving the door downward caused the reopening of the supply circuits of relays 20 and 30, and that the reopening of contactors 20C and 20D broke the supply circuit to running winding 18, starting winding 19 also being left deenergized with contactor 20B open.

With this circuit arrangement, the centrifugally operated speed responsive switch 21 of motor 15 serves an automatic control function, in such a way that no lower limit switch is required, and in such a way also that a special safety factor is provided in that the system will be stopped short of the full closure of the door if it encounters an abnormal distribution such as the body of an automobile, or a child's vehicle left in the way, or a human body.

If it were desired to stop the downward propulsion of the garage door prior to the stalling of motor 15, switch 17 could be momentarily depressed to accomplish this purpose. Depression of this switch while motor 15 was driving the door downward would again energize relay 10, providing a circuit from supply main 31 through contactor 30C and contactor 10A to terminal 28 of relay 20, shorting out the supply current of this coil and opening relay 20, to deenergize the motor as aforementioned. Until the release of switch 17 and the deenergization of relay 10, relay 30 remains energized even after the opening of relay 20. Upon release of switch 17, relay 10 is released, and the consequent opening of contactor 10B interrupts the energization circuit through contactor 30E, so that relay 30 is deenergized. The discharge of capacitor 24 through the coil of relay 40 takes place in this instance upon the reclosure of contactor 20A, just as aforedescribed in response to reclosure of switch 21 due to the stalling of motor 15.

It will be observed that the system is left in the same set of conditions, whether the downward drive of the garage door is stopped by the normal stalling of motor 15, or stopped at an intermediate level by momentary depression and release of switch 17.

Now, when next it is desired to cause the door to be opened, switch 17 is again depressed, energizing relay 10, and again energizing relay 20 through contactors 30D and 10A, and providing a holding circuit for relay 20 through contactor 20B and resistor 35.

Starting winding 19 is energized concurrently with the supply of the alternating current power to the coil of relay 20, and running winding 18 is immediately thereafter supplied through contactors 20C and 20D, through contact arms 41 and 42 of relay 40 in their left-hand throw, so that the energization of the motor is in the phase relation to provide upward drive of the garage door, commencing immediately. Again, the motor is promptly accelerated beyond the speed at which switch 21 opens prior to the release of switch 17, and when switch 17 is released, relay 30 is again energized through contactor 20B and 10C. Lamp 25 is thereupon illuminated through contactor 30B.

The upward drive of the garage door may be stopped at any desired intermediate door position by momentary depression of switch 17. This temporarily energizes relay 10, bringing terminal 28 of relay 20 to the potential of supply conductor 31 through contactors 30C and 10A as aforedescribed, deenergizing relay 20 and also causing the restoration of ganged arms 41 and 42 of relay 40 to the right-hand throw by virtue of the discharge of capacitor 24 through contactor 20A and the coil of relay 40. Relay 30 as before remains energized after the opening of relay 20, until switch 17 is released, the supply to relay 30 then being broken at contactor 10B.

In the absence of such an operation of switch 17 with the door intermediate in its upward travel, motor 15 drives it all the way to the upper limit of its travel, where its progress is blocked, so that motor 15 is thereupon stalled, with the result that switch 21 is reclosed.

Again, with the reclosing of switch 21, the coil of relay 20 is effectively short-circuited so that relay 40 is energized and relay 30 is deenergized, all elements of the circuit being restored to the conditions as illustrated in Fig. 1.

Thus, the present control system permits starting as a result of a momentary depression of the control switch, being equally susceptible of starting as a result of closure of a relay contactor shunting switch 17 and operated by the output of a remote control radio receiver located in the vicinity of the garage door and arranged to receive a brief carrier transmission from a remote control transmitter. It is capable of being arrested at any desired position in its upward or downward travel by a further momentary closure of switch 17 or a remote control circuit relay. After the arrest of propulsion in one direction, the circuit arrangement is automatically reset to be thereafter started by further depression for operation in the opposite direction. Limit switches are entirely obviated, the drive system being stopped simply by the stalling of the motor as the door arrives at the upper limit or lower limit of its travel.

A modified version of this control system is shown in Fig. 2. In this circuit arrangement, relay 110 is arranged to be operated through transformer 12 and momentary contact switch 17. This relay corresponds to low voltage alternating current relay 10 of Fig. 1, except that it is provided with an additional normally open single pole contactor 110D.

Relay 120 corresponds generally to relay 20 of

Fig. 1. This relay is provided as before with resistor 35, and terminal 28 of relay 120 is connected to the movable arm of contactor 110A, and also to the terminal of the starting winding 19 opposite the terminal thereof connected to speed-responsive switch 21.

Relay 130 in Fig. 2 corresponds generally to relay 30 of Fig. 1, except that the A—B double throw contactor system is eliminated, leaving normally open contactors 130E and 130C and normally closed contactor 130D.

Fig. 2 illustrates the circuit conditions with all relays deenergized, the conditions prevailing with the garage door closed.

Conventional relays 150 and 160 working together are arranged to serve the purposes of relay 40 of Fig. 1, obviating this stepping relay and its rectifier and capacitor circuit elements 23 and 24. Relays 150 and 160 are arranged to respond to operations of relay 120, one full operating cycle of relays 150 and 160 being accomplished by two successive cycles of operation of relay 120, in the same manner as one complete cycle of operation of relays 120 and 130 is accomplished by two cycles of operation of relay 110.

Considering the system just as illustrated in Fig. 2, the garage door being closed, operation is commenced by a depression of switch 17, temporarily energizing relay 110. Relay 120 is thereupon energized through a circuit traceable from supply main 31 through its coil, and through contactors 110A and 130D, to the opposite (grounded) supply main. With the closure of relay 120, a holding circuit is provided through contactor 120B and resistor 35. At the same time, the starting winding 19 of motor 15 is energized, this starting winding and the internal centrifugal switch 21 being connected, as before, in series, across the coil of relay 120 and thus being arranged for connection to the alternating current supply in only one polarity sensing.

Also, with contactor 120B thus closed, the grounded alternating current supply main is connected through conductor 123 to a pair of oppositely connected stator terminals of the double-pole, double-throw reversing switch armature arrangement including arms 161 and 162 of relay 160. The other stator elements of this double-throw reversing switch armature arrangement are connected to the circuit of supply main 31 to be energized through thermal cut-out 14 and fuse 16.

Relay 150 is energized, through the circuit traced from supply conductor 31 through the coil of relay 150, through contactor 120F, through arm 161 of relay 160 in its upper throw position, and through conductor 123 and contactor 120B to the opposite supply main. A holding circuit for relay 150 is provided through resistor 135, and contactor 150B, in a manner similar to the holding circuit arrangement of relay 120 involving resistor 35 and contactor 120B.

The running winding 18 of the motor is energized with its upper terminal supplied through contact arm 162 from supply main 31, and its lower terminal supplied from the opposite supply main through contactor 120B, conductor 123, arm 161 of relay 160 and the upper stator contact element therefor, and resistor 22, provided as in the arrangement of Fig. 1 for presetting the stall torque characteristics of the motor 15.

With these circuit conditions established substantially immediately upon the depression of switch 17, the motor 15 promptly commences driving the door upward and is very quickly accelerated through the rotor speed at which speed responsive centrifugally operated switch 21 is opened. Upon the release of switch 17 thereafter, relay 110 is deenergized, with all of its contactors except contactor 110C being opened. Through this latter contactor, now reclosed, a circuit is established for energization of the coil of relay 130 through contactor 120G and 110C, and contactor 130D is thereupon opened and contactors 130C and 130E are closed. The supply to the running winding 18 of motor 15 is not disturbed by this operation, and the motor continues driving the door upward; and lamp 26 is illuminated, current therefor being supplied through contactor 150A.

The upward drive of the garage door may be stopped with the door at any intermediate position by a brief depression and release of switch 17, or in the absence of such depression it will be stopped by the stalling of motor 15 as the door encounters the upper limit of its range of movement. As in the case of the circuit arrangement of Fig. 1, the system is left in the same condition whether the door is stopped at an intermediate position by momentary depression and release of switch 17 or is stopped at the top of its travel by the motor stall action; and in either case, the double-throw switching relay 160 is left in the condition with its arms thrown to the opposite throw position, to provide for opposite propulsion at the next operation—i. e. for downward propulsion.

Taking first the case of stopping the door during its upward travel through the employment of switch 17, the depression of this switch again opens contactor 110C and closes contactors A, B and D of relay 110. With this closure of contactor 110A, a shorting circuit is provided from supply main 31 through contactor 130C and contactor 110A, placing terminal 128 at the same potential as the opposite terminal of the coil of relay 120, and thus deenergizing this relay and breaking its holding circuit through contactor 120B and resistor 35, the full alternating current line voltage momentarily being placed across resistor 35. With the opening of contactor 120B, the circuit through conductor 123 is opened, and accordingly the energization for the running winding of the motor 15 is interrupted, causing the system to come to a stop. Relay 130 remains energized at this time, its coil circuit being supplied now through contactors 110B and 130E, from a time immediately prior to the opening of contactor 120G. Relay 160 is now energized, the circuit therefor being traced through contactor 150A and reclosed contactor 120E. Therefore, contactor 160A is closed. Now, upon the release of switch 17, relay 110 is again deenergized and relay 130 is thereupon deenergized as a result of the opening of contactor 110B in view of the open condition of contactor 120G. Relays 150 and 160 remain energized, and arms 161 and 162 accordingly remain in their lower positions for downward direction propulsion, and lamp 25 remains on.

If, instead of the operation of switch 17 to arrest the upward travel of the door at an intermediate position, the motor 15 were permitted to propel the door to the top of its range of movement, the reclosure of switch 21 upon the stalling of motor 15 would serve similarly to short-circuit the supply of relay 120, causing the release of its armature elements, and the consequent opening of contactor 120B opens the supply circuit of conductor 123 to the running winding of motor 15. The starting winding circuit also is opened by the opening of contactor 120B. The opening of contactor 120G immediately breaks the holding circuit of relay 130, so that this relay also is released. The reclosure of contactor 120E completes a circuit for the energization of relay 160, through contactor 150A of energized relay 150, and thus the same circuit conditions exist with the arms 161 and 162 of relay 160 in their downward throw, with lamp 25 illuminated and with relays 150 and 160 energized, as resulted after momentary depression and release of switch 17 to arrest the door at an intermediate point in its upward travel.

Now, the door may be started downward by a further momentary closure of switch 17, again energizing relay 110. Through this relay, relay 120 is again energized, and the motor 15 is energized through contactor 120B, this time with the running winding connected in the opposite sense to the supply mains for reverse-direction operation to drive the door downward. Through relay 120, a circuit is this time provided for shorting the supply to the coil of relay 150, this circuit being traced from supply main 31 through downwardly deflected contact arm 161, through contactor 120F to the upper terminal 228 of the coil of relay 150, the opposite end of which is fixedly connected to the circuit of supply main 31. Relay 150 is thereupon deenergized but relay 160 remains energized through contactor 160A and contactor 120G.

The motor 15 having commenced driving the door downward and speed-responsive switch 21 having opened, the release of switch 17 again turns off relay 110, but relay 120 remains energized by virtue of its holding circuit through contactor 120B and resistor 35. Relay 130 is now energized once more through contactors 120C and 110C, to remain thus energized during the downward propulsion of the door.

Just as in the case of upward propulsion, the downward door travel may be stopped and the circuits all restored to the conditions illustrated in Fig. 2, either by a momentary depression of switch 17 followed by its release providing an intermediate stop of the door, or by the stalling of motor 15 upon full closure of the door. Again describing the operation commencing with depression of switch 17, the closure of this switch provides energization of relay 110, and relay 120 is thereupon released due to the short-circuiting of its coil through contactors 130C and 110A. This provides for the opening of the running winding circuit by the opening of contactor 120B, and for safeguarding against energization of the starting winding by the open condition of the same contactor.

Relay 150 remains deenergized and relay 130 remains energized, but relay 160 is deenergized by the opening of contactor 120G at this time while contactor 150A remains open. Accordingly, double-throw armature reversing circuit arms 161 and 162 of relay 160 are released to their upward throw position, preparing the circuit for upward propulsion at the next actuation of motor 15.

The release of switch 17 again deenergizes relay 110, resulting in the deenergization of relay 130 due to the opening of contactor 110B, contactor 120C also being open. Now, the circuit conditions exist as shown in Fig. 2.

The circuit conditions similarly are provided in the alternative by the stalling of the motor 15 as the door closes fully, or as it descends upon an obstruction, the reclosing of speed-responsive switch 21 providing the required short-circuiting of the coil of relay 120, and the opening of contactor 120C breaking the energization circuit of relay 130 immediately.

Thus, it is seen that relays 150 and 160 coact to provide the effect of a cyclical phase reversal of the supply to the running winding of the motor 15, a full cycle of operation of relay 160 being timed according to two full cycles of operation of relay 120, and relay 120 being timed to one cycle of operation with two cycles of relay 110, in the same manner as relays 20 and 30 of Fig. 1 are arranged for two-to-one step-down cycling relative to the operations of relay 10 of that figure.

The control system of Fig. 3 provides control of motor 15 in the same general way as the arrangements of Figs. 1 and 2, in that cyclical control is provided for starting the motor to drive the door downward in response to a first signal impulse, stopping its descent by a second signal impulse, starting the motor in the opposite direction to drive the door upward in response to a third signal impulse, and stopping its ascent by a fourth signal impulse, the initial circuit conditions prevailing for the subsequent commencement of a complete cycle of operation. Like the prior embodiments, the system of Fig. 3 is arranged for the stalling of the motor when the door descends to its limit to serve the same purpose as the second impulse, setting up the conditions for the system to receive the third signal impulse and respond properly thereto; and similarly for the stalling of the motor at the upper limit of the door travel to provide circuit operations equivalent to the signalling of the fourth impulse of the above-recited cycle.

In Fig. 3, two voltage step-down transformers 212 and 213 with their primary windings both normally energized and their low-voltage secondary windings 215 and 216 connected in series-opposition are provided for the control circuit of the momentary-actuation low-voltage A. C. relay 210. A resistor 214 is included in series with secondary 215, and the momentary-contact switch 17 is connected for effecting a momentary short-circuit across the series combination of winding 215 and resistor 214. When switch 17 is closed, therefore, the coil of relay 210 is supplied directly by winding 216, and hence the relay is actuated with its contactors 210A and 210B both momentarily closed.

Stepping or sequence relay 270 is provided with a D. C. actuation circuit including rectifier 23 and capacitor 24, connected to be actuated through contactor 210A. Contactor 210B short-circuits resistor 22 each time switch 17 is depressed.

Relay 270 includes a first stack of contactors 271, 272 and 273 ganged together, a second stack of contactors 274, 275 and 276 ganged together, and one additional contactor 277. The conditions of the circuit elements as illustrated in Fig. 3 are the conditions prevailing with the garage door at the upper limit of its travel, and with the motor turned off. The contactors of the first and second stacks are all open, but contactor 277 is closed so that the lamp 25 is illuminated.

Switch 17 is momentarily depressed to start the door downward. This momentarily shorts winding 215 and resistor 214 out of the circuit of the winding of relay 210, leaving the full voltage of secondary 216 to energize this relay and provide closure of contactors 210A and 210B. The primary supply circuit of relay 270 is then energized through the rectifier-capacitor circuit therefor and contactor 210A, with the result that the armature cam of this relay is advanced from its initial position to its second position with the first stack of contactors 271, 272 and 273 closed and contactor 277 also remaining closed, the contactors of the second stack remaining open.

With the closure of contactor 273, the series circuit of starting winding 19 and speed-responsive switch 21 is energized with the switch end of the circuit connected to supply main 231 and the right-hand end of the starting winding connected to conductor 232' in circuit with the opposite supply main 232. Running winding 18 of the motor 15 is connected between the supply mains, the upper end of this winding in series with resistor 22 being connected through contactor 271 to conductor 231 and the lower end of winding 18 being connected through contactor 272 to conductor 232'. Until the motor accelerates beyond the intermediate speed for which switch 21 is preset, this switch remains closed, and through it and contactor 273, the primary winding of transformer 212 is shorted out, retaining relay 210 energized even though switch 17 may be released before the motor 15 has accelerated appreciably. During this time, contactor 210B shorts resistor 22 out of the running winding circuit, and the motor is thus started off in the direction driving the door downward with full torque. The motor very quickly accelerates beyond the speed at which switch 21 is opened, and with the opening of this switch and the opening of switch 17, the motor continues in its steady-state operating conditions, driving the door downward with just winding 18 energized, and with the torque limiting resistor 22 in circuit therewith.

As in the previously described embodiments of this invention, the motor 15 may be deenergized by a depression of switch 17 before the door reaches the lower limit of its travel, or alternatively, the arrest of the door at this lower limit may be relied upon for automatic deenergization of the motor. If the deenergization is accomplished by use of switch 17, this switch is momentarily closed to short secondary 215 (and resistor 214) out of the primary circuit of relay 210, leaving a net effective voltage for momentary actuation thereof. With the momentary closure of contactor 210A, the cam system of relay 270 is advanced to its third position at which all contactors of this sequence relay are open. With this condition, all circuits of the motor 15 are open, and the lamp 25 is out.

If switch 17 is not employed for arresting the downward travel of the door at an intermediate position, motor 15 drives it on downward until it encounters the garage floor or apron, or any object offering appreciably increased resistance to the descent of the door, as a velocipede or child's wagon, or a bank of ice as may be present in winter conditions. Thereupon, motor 15 is stalled, and switch 21 thereof recloses, short-circuiting the primary winding of transformer 212 through contactor 273, and thereby removing the secondary voltage thereof from the circuit of relay 210 just as effectively as if the secondary winding 215 had been momentarily shorted. A net operating voltage is thus provided by transformer 213 for actuating relay 210, to cause the advancement of the cam system of relay 270 to the third position with all contactors open, and thus the same circuit conditions are made to prevail in this way as could have been obtained by use of switch 17 to stop the descent of the door.

A further momentary depression of switch 17 may be used to start the raising of the garage door. Relay 210 is again momentarily energized, temporarily shorting out resistor 22, and stepping relay 270 to its fourth cam position, with contactors 274, 275, 276 and 277 actuated. Both windings of motor 15 are energized through the contactors of the second stack, viz. contactors 274, 275 and 276. Due to the cross-connections between contactors 271 and 272 of the first stack and 274 and 275 of the second stack, the running winding of the motor 15 is energized in the opposite phase sense, so that the motor propulsion is in the opposite direction for upward drive of the door. Again, the supply of the starting winding 19 is interrupted by the opening of switch 21 as the motor accelerates, the resistor 22 is restored to effectiveness in the circuit of the running winding with the release of switch 17.

The arrest of the motor actuation circuit is accomplished either by use of switch 17 or by the operation of switch 21 upon stalling of the motor as the door reaches the upper limit of its travel, the cam system of relay 270 being advanced from its fourth position to a position corresponding to the first position, with contactor 277 retained closed and the remaining contactors open, so that the lamp 25 remains on and the motor circuits are all inactive.

Figure 4:
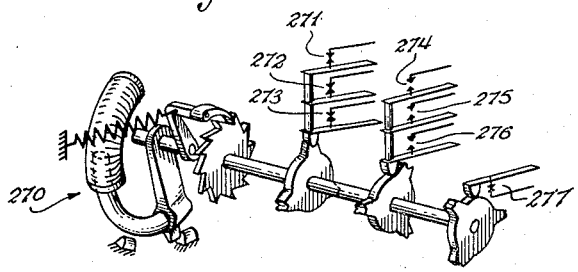

One practical form for relay 270 is illustrated in Fig. 4, as comprising an angular-motion solenoid motor 290 coupled through a ratchet system to a series of three cams 291, 292 and 293 upon a common shaft 294, and arranged to accomplish a 30-degree angular advancement of the three-cam system with each actuation of the angular-motion solenoid motor. One complete cycle of the operations of the garage door is accomplished with four 30-degree steps of the cam system, or 120 degrees rotation thereof, and the next cycle of door operations is accomplished with a similar series of four 30-degree steps, three sequences of similar sets of four contactor actuation steps being provided in one complete revolution of the cams.

The thermal cut-out 14 in motor 15 serves not only as a safety feature for protecting the motor but also as a device for correcting the cycling of the system if the relay sequence somehow gets out of step with the operations of the door. Assuming, for example, that the door is at rest at the lower limit of its travel and that an actuation of switch 17 and relay 210 brings about such an advancement of the cam system in relay 270 as to close the contactors 271, 272 and 273 of the first stack, the motor 15 is energized in the sense to drive the door downward. As the door cannot yield in this direction, the motor remains completely stalled. With the resultant excessive current through the resistance coil of the thermal cut-out, the contactor therein is opened.

This removes the power from all parts of the control system, leaving the first stack of contactors 271-273 of relay 270 closed. When the cut-out unit 14 has cooled its contactor automatically recloses. Relay 210 must again be actuated, whether or not switch 17 has remained depressed, because the circuit through switch 21 and the bottom contactor of the stack of closed contactors shorts out the primary circuit of transformer 212.

Thus, relay 270 is stepped immediately upon the reclosure of thermal cut-out 14. Thereafter, the next momentary energization of switch 17 serves to start the system with propulsion of the door in the correct direction. The operation of cut-out 14 serves similarly for out-of-step operation at the opposite terminal position of the door.

As many changes could be made in the above construction and many widely different embodiments of this invention could be made without departing from the scope thereof, it is intended that all matter contained in the above description or shown in the accompanying drawings shall be interpreted as illustrative and not in a limiting sense.

What is claimed is:

1. A control system for propulsion of an object between first and second limits of travel thereof, comprising a reversible electric motor coupled to said object, a control circuit therefor including a switch circuit, means in said control circuit responsive to a momentary closure of said switch circuit when said object is at said first limit of its travel for providing sustained energization of said motor for operation in the direction driving said object toward said second limit of its travel, means in said control circuit responsive to a momentary closure of said switch circuit while said object is being propelled toward said second limit of its travel for deenergizing said electric motor and conditioning the control system to receive a further input circuit closure for instituting propulsion of said object toward said first limit of its travel, means in said control circuit responsive to the reaction of said electric motor to the increased propulsion resistance upon arrival of said object at said second limit of its travel for deenergizing said electric motor and conditioning said system to receive a further switch circuit closure for instituting propulsion of said object toward said first limit of its travel, and means in said control circuit responsive to a momentary closure of said switch circuit after arrest of propulsion of said object toward said second limit of its travel for instituting operation of said electric motor in the direction driving said object toward said first limit of its travel.

2. A control system as defined in claim 1, further including means for automatically arresting the propulsion of said object toward said first limit of its travel and conditioning the control system to receive a further switch circuit closure for instituting propulsion of said object toward said second limit of its travel.

3. A control system as defined in claim 2, wherein said last-named means comprises switch means actuated by said object in the vicinity of said first limit of its travel for deenergizing said electric motor and providing a reversed-direction starting circuit therefor and maintaining said reversed-direction starting circuit intact while said object is in the immediate vicinity of said first limit of its travel.

4. A control system as defined in claim 2, wherein said means for automatically arresting the propulsion of said object toward said first limit of its travel and conditioning the control system to receive a further switch circuit closure for instituting propulsion of said object toward said second limit of its travel comprises means responsive to increased propulsion resistance upon arrival of said object at said first limit of its travel for interrupting the energization of said electric motor and revising its control circuit for direction reversal.

5. A control system for driving a movable object selectively from a first limit position to a second limit position and from said second limit position to said first limit position comprising a reversible electric motor mechanically coupled to said movable object, an electric power supplying circuit connected to said motor and including an impulse receiving circuit, means responsive to an impulse received therein when said object is in said first limit position for providing sustained electric energization of said motor to drive said object from said first limit position to said second limit position, means in said electric power supplying circuit responsive to decreased speed of the motor due to the increased resistance to travel of said object as said object reaches said second limit position for deenergizing said motor and leaving said electric power supplying circuit in condition to be energized for propulsion of said object toward said first limit position, and means responsive to a further impulse received in said receiving circuit when said object is in said second limit position for providing sustained electric energization of said motor in the sense to drive said object from said second limit position to said first limit position.

6. A system for propulsion of an object between first and second limits of travel thereof, comprising a reversible electric motor mechanically coupled to said object for driving it toward one or the other of said limits, a power supplying and controlling circuit for said motor including means for selectively maintaining four successive circuit conditions therein, the first circuit condition having the motor deenergized with the object at the first limit of its travel, the second circuit condition having the motor energized to operate in the direction driving the object toward the second limit of its travel, the third circuit condition having the motor deenergized with the object at the second limit of its travel, and the fourth circuit condition having the motor energized to operate in the direction driving the object toward the first limit of its travel, electric impulse means connected in said power supplying and controlling circuit and operable during any one of said four circuit conditions for advancing it to the next of said successive circuit conditions, and means responsive to a speed reduction of said motor due to increased load thereon for advancing said control circuit from one of said conditions with the motor energized to the next condition with the motor deenergized.

7. A control system as defined in claim 6, said power supplying and controlling circuit including a first relay responsive to said electric impulse means, second and third relays connected for operation through said first relay, and a sequence relay connected for step-operation through the armature of said second relay upon release thereof, said reversible electric motor having a running winding and a starting winding and a speed-responsive switch connected to said starting winding, said four relays and said motor being deenergized and said speed-responsive switch being open when said object is at one limit of its travel and said sequence relay including double-throw armature reversing switch means in connection with said motor in the sense for operation of the motor in the direction for driving said object toward the opposite limit of its travel, said first relay being energized coextensively with the operation of said electric impulse means, said second relay being energized through said first relay upon energization thereof, and including a holding circuit for maintaining itself energized after the impulse energization of said first relay, said second relay including at least one armature contactor connected to said electric motor for energizing said motor upon energization of said second relay and interrupting the supply to said motor upon the deenergization thereof, said third relay having an energization circuit connected to the armatures of said first and second relays to be operated upon deenergization of said first relay with said second relay remaining energized, said third relay including a holding circuit maintained through alternative paths through the armatures of said first and second relays while either of said first and second relays is energized, said third relay also including an armature contactor connected in series with an armature contactor of said first relay for deenergizing said second relay when said first and third relays are both energized, whereby said second relay is deenergized upon actuation of said input circuit during propulsion of said object and said third relay is deenergized upon deenergization of said input circuit.

8. A control system as defined in claim 6, said power supplying and controlling circuit including a first relay responsive to said electric impulse means, second and third relays connected for operation through said first relay, and fourth and fifth relays connected for operation through the armature of said second relay, said reversible electric motor having a running winding and a starting winding and a speed-responsive switch connected to said starting winding, said five relays and said motor being deenergized when said object is at one limit of its travel, said first relay being energized coextensively with the operation of said electric impulse means, said second relay being energized through said first relay upon energization thereof and including a holding circuit for maintaining itself energized after the impulse energization of said first relay, said third relay having an energization circuit connected to the armatures of said first and second relays to be operated upon deenergization of said first relay with said second relay remaining energized, said third relay including a holding circuit maintained through alternative paths through the armatures of said first and second relays while either of said first and second relays is energized, said third relay also including an armature contactor connected in series with an armature contactor of said first relay for deenergizing said second relay when said input circuit is actuated during a period when both said second and third relays are energized, whereby said third relay is deenergized upon the deenergization of said first relay, said fourth and fifth relays being interconnected with armature contactors of said second relay in the same manner as said second and third relays, respectively, are interconnected with armature contactors of said first relay, said second relay including at least one armature contactor connected in circuit with said motor for holding the motor circuit open when said second relay is deenergized, and said fifth relay including armature contactors connected for reversing the feed circuit connections of one winding of said motor for reversing the propulsion thereof when said fifth relay is energized.

9. A control system as defined in claim 6, said power supplying and controlling circuit including a first relay responsive to said electric impulse means, a sequence stepping relay connected to the armature of said first relay to be advanced one step upon each energization thereof, said reversible electric motor having a running winding and a starting winding and a speed-responsive switch connected to said starting winding, said sequence stepping relay having a first set of contactors connected to said motor for supplying the windings thereof in the phase for propulsion of said object toward said second limit of its travel and a second set of contactors connected to said motor for supplying the windings thereof in the phase for propulsion of said object toward said first limit of its travel, said sequence stepping relay including four steps in one cycle of its operation, with said first set of contactors operated at the first step, said first and second sets of contactors being released at the second step, said second set of contactors being operated at the third step, and said first and second sets of contactors being released at the fourth step, and said power supplying and controlling circuit including coupling means between said speed-responsive switch and said first relay for energizing said first relay while said speed-responsive switch is in its low-speed throw and one of said sets of contactors of said sequence stepping relay is operated.

GEORGE F. RICHARDS.

REFERENCES CITED

The following references are of record in the file of this patent:

UNITED STATES PATENTS

| Number | Name | Date |
|---|---|---|
| 1,611,561 | Robinson | Dec. 21, 1926 |
| 1,848,136 | Meissner | Mar. 8, 1932 |
| 2,342,597 | Opalek | Feb. 22, 1944 |
| 2,425,312 | Gower | Aug. 12, 1947 |